DI-FUNCTION CONVERTERS

Filed Nov. 22, 1952

INVENTOR.
FLOYD G. STEELE
BY
Walter J. Jason
ATTORNEY 2,850,726
Patented Sept. 2, 1958

2,850,726

DI-FUNCTION CONVERTERS

Floyd G. Steele, La Jolla, Calif., assignor to Digital Control Systems, Inc., a corporation of California Application November 22, 1952, Serial No. 322,095
16 Claims. (Cl. 340—347)

This invention relates to di-function converters and more particularly to devices for converting random single-valued and two-valued input signals into equivalent di-function signals.

As understood in the present application, a di-function signal represents a sequence of +1 and —1 values and generally comprises alternate high and low voltage levels, each appearing for an integral number of timing intervals, the information contained therein being determined by the durations of one voltage level relative to the other. More particularly, a high voltage level appearing for one timing interval has been defined as a +1 instantaneous di-function value, hereafter referred to as a +1 value, while a low voltage level appearing for one timing interval is defined as a —1 instantaneous di-function value, termed a —1 value. Alternate +1 and —1 values in a di-function signal represent a zero valued di-function signal, an excess of +1 over —1 values representing a positively value di-function signal, with an excess of —1 values representing a negatively valued one.

Information relating to a rotating shaft has been converted by a di-function quantizer directly into a di-function signal in which form various di-function arithmetic operations are performed thereon. However, shaft rotational information is only one such type which may, in practice, be converted into di-function form for further di-function arithmetic manipulations thereon. One frequently occurring type of information is that contained in random appearing electric signals representing what is here termed a single-valued function, which may in turn represent either random up counts, random down counts, rotations of a shaft having only one direction of rotation, etc. Another type of information is that contained in random signals appearing separately on two lines, representing what is termed a double-valued function, which signals may represent both up and down counts, rotation of a shaft having two directions of rotation, etc.

One converter of the present invention acts to convert a single-valued signal into an equivalent di-function signal. This is accomplished by generating a normally zero-valued di-function signal of alternate +1 and —1 values and then modifying the value of the di-function signal so that it contains an extra +1 value, that is, a +1 value appearing for two consecutive timing intervals, on each appearance of an input signal.

Another converter serves to convert a double-valued signal into an equivalent di-function signal. This converter also generates a normally zero-valued di-function signal but in response to each signal appearing on one output line, representing for example a count-up, produces an extra +1 value in its output signal. Upon apperance of each input signal on the other input line, representing for example a countdown, an extra —1 value is generated in its output di-function signal.

In addition, a device is illustrated and described for converting random appearing pulse information into a voltage level form particularly suited for application to the converter input conductors of the present invention.

It is, therefore, the principal object of the present invention to provide a device for converting random signal information into di-function form.

Another object of the present invention is to provide a device for converting the information contained in random signals appearing on a single conductor into a corresponding di-function signal.

Still another object of the present invention is to provide a device for generating a normally zero-valued di-function signal but producing an extra +1 value therein on receipt of each random input signal.

A further object of the present invention is to provide a device for converting information contained in a pair of random signals appearing on a pair of input conductors, respectively, into an equivalent di-function signal.

A still further object of the present invention is to provide a device for generating a di-function signal normally having alternate +1 and —1 values but responsive to each random input signal appearing on one conductor for generating an extra +1 value and responsive to each random appearing signal on another input conductor for generating an extra —1 value.

Other objects and features of the present invention will be readily apparent to those skilled in the art from the following specification and appended drawings wherein is illustrated a preferred form of the invention, and in which.

Figure 1:
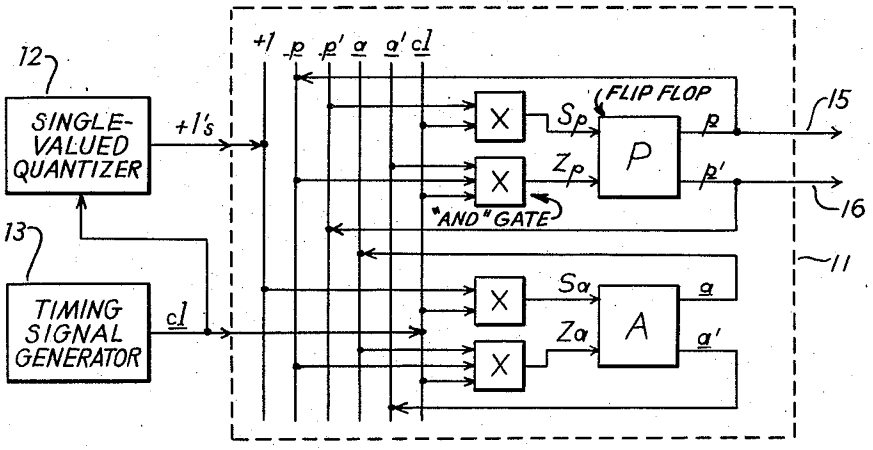
Fig. 1 is a block schematic circuit diagram of a single-valued di-function converter according to the present invention.

Referring now to the drawings, there is illustrated in Fig. 1, a single valued di-function converter 11, according to the present invention. Converter 11 receives one input signal, designated +1, from a source of random signal information, such as a single-valued quantizer 12, and receives a timing input signal, designated *c*1, from a source of timing signals, such as timing signal generator 13. Generator 13 may be a conventional multivibrator circuit producing a square wave output signal or may be the timing track, with appropriate amplifiers, of a magnetic storage drum. Each adjacent low and high voltage level of signal *c*1 measures or indicates one timing interval, with signal *c*1 also being applied to quantizer 12 so as to synchronously control the operation thereof with converter 11.

Quantizer 12 may be of the type illustrated and described in co-pending U. S. application for patent Serial No. 322,096 filed November 22, 1952, now U. S. Patent No. 2,733,431, issued January 31, 1956, for "Quantizer," to Floyd G. Steele, and will thus produce a high output voltage level, or +1 signal appearing for one-half of a timing interval upon each completion of each predetermined input information change, such as a shaft rotation, a keying operation, etc., not here illustrated. Within converter 11 are found a pair of electronic switching devices, such as flip-flops, one being a principal flip-flop P and the other an input flip-flop A, each of conventional bi-stable type whose input and output circuits are designated in accordance with the custom previously established in each of the above referred to applications for patent. Gating circuitry, to be later described, is connected to the flip-flop P and A input conductors and provide triggering operations therefor.

Although the circuitry and designations employed for preferred types of flip-flops and gating circuits are revealed in detail in the prior noted application, by way of summary, each flip-flop of both embodiments of the present invention is represented by a box having its alphabetical designation placed therein in capitalized form. Its two output signal conductors are each indicated by the same lower case letter given its own designation, one being primed to represent the complementary signal. Each flip-flop's two input conductors are given respective S and Z connotations, each followed by the flip-flop's letter, the meaning being that each triggering signal applied through the S conductor "sets" the conduction state of the flip-flop to represent the binary one value as exemplified by a high positive voltage level appearing on the unprimed output signal conductor, the primed signal being accordingly driven to the complementary or low voltage level. On the other hand, each triggering signal applied through the Z conductor reverses the conduction state from that just described with low and high voltage levels thereby being produced on the unprimed and primed output conductors, respectively.

In the present invention, only one type of gating circuit is required, the "and" variety, each being schematically represented by a box having an "X" mark therein to signify logical multiplication. Although a variety of logical "and" gates are known and may be utilized in the illustrated circuitry, one preferred kind is the crystal diode type in which each of the input conductors thereto is connected to the cathode of an associated crystal diode, preferably of the germanium type, with the anodes of all such diodes being mutually joined to one end of a relatively high valued resistor. With the other end of the resistor coupled to a source of relative high positive potential, this junction point, constituting the output terminal of the gating circuit, will be at the high voltage level only if all of the input signals applied thereto are likewise simultaneously at their high levels. Upon any or all of these input signals being low, the output signal will likewise be low.

Since the clocking signal is applied to each of the "and" circuits in the present invention and since the output terminal of each "and" circuit is coupled to a separate flip-flop input conductor, a triggering signal will be applied to a flip-flop input conductor at the end of any timing interval that all of the input signals exclusive of the clock to a given gating circuit are simultaneously high. This is true since the clock will switch low at the end of each timing interval, as noted above, and this action serves under the above assumed condition to impress a negative pulse on the particular flip-flop's input conductor as required for triggering purposes.

Broadly the operation of converter 11 is such that, with flip-flop A in one conduction state, flip-flop P is alternately triggered at the beginning of each signal *c*1 timing interval into its other conduction state such that its complementary output signals *p* and *p'* appearing on the converter output terminals 15 and 16, respectively, comprise complementary alternate high and low voltage levels. Accordingly, signal *p* has a normal zero di-function value.

However, upon receipt of a +1 signal from the input conductor of quantizer 12, flip-flop A is triggered thereby to its other conduction state and the gating circuitry, sensing this other conduction state of flip-flop A, fails to trigger flip-flop P into its next regularly occurring signal *p* low voltage level so that signal *p* remains high for two consecutive timing intervals. At the end of this time, signal *p* automatically returns low and, simultaneously therewith, flip-flop A is triggered back to its normal conduction state with the result that converter 11 both continues to produce its normally zero valued di-function output signal and is prepared for receipt of the next +1 signal from quantizer 12.

The manner by which this is accomplished may be most readily seen by reference to the below illustrated programming table I, corresponding to similar programming tables in the referred to applications.

PROGRAMMING TABLE I

| Line | Contents | | To generate | |
|---|---|---|---|---|
| | *a* | *p* | *a* | *p* |
| 1 | −1 | −1 | ---------- | +1 |
| 2 | −1 | +1 | ---------- | −1 |
| 3 | +1 | −1 | ---------- | +1 |
| 4 | +1 | +1 | −1 | ---------- |
| Col | 1 | 2 | 3 | 4 |

On lines 1 and 2, column 1, is shown the normal conduction state of flip-flop A where signal *a* is low or equal to the −1 di-function value while opposite this value in column 2 are found the two normally occurring values −1 and +1 of signal *p*. As indicated in column 4, for each case shown on lines 1 and 2, flip-flop P is to have its conduction state reversed at the end of the respective timing interval as indicated by the +1 and −1 values set forth in the "to generate" column 4, respectively. Hence, lines 1 and 2 define the normal operation of converter 11 where no input signal has been received from quantizer 12.

On lines 3 and 4 is illustrated the converter's operation upon receipt of an input signal. As stated previously, such an input +1 signal is utilized to reverse the conduction state of flip-flop A. Hence, after the conduction state change, signal *a*, as indicated in lines 3 and 4, will be equal to +1. Now, as will be apparent, such an input signal may occur to produce an *a*=+1 when signal *p* is either equal to *a*−1, as on line 3, or *a*+1, as on line 4. Considering first the case defined on line 3, flip-flop P is to be reversed as indicated in column 4 so that the next regularly occurring +1 value of signal *p* will be produced. This step obviously does not produce the extra +1 output value as required for indicating di-function-wise the +1 signal receipt. Hence, the programming defined on line 3, simply sets up the Contents defined on line 4 where *a* and *p* are each equal to +1. With this programming achieved, nothing further is done to flip-flop P, as indicated in column 4, line 4, so that the +1 value of signal *p*, then appearing, will continue for the next following timing interval. Accordingly, signal *p* will contain two consecutive +1 values, the additional or extra +1 value thereof indicating receipt of the input +1 signal. However, signal *a* is to be changed, as shown in line 4, column 3, back to its normal −1 value at the beginning of the next timing interval and with the generation indicated in columns 3 and 4, line 4, attained, the programming indicated on line 2 will be produced with signal *p* again varying between alternate −1 and +1 values in the normal manner.

If, however, flip-flop A is initially switched so that *a* equals +1 at the instant *p* equals +1, as on line 4, the programming indicated on line 3 is omitted and an extra *p*=+1 is immediately generated during the next timing interval. As is apparent, owing to the necessity of providing the programming of line 3, input +1 values cannot occur during consective timing intervals but must be spaced by at least two full timing intervals. This is readily accomplished by properly relating the input information change to quantizer 12 with the frequency of timing signal *c*1.

From Programming Table I may be written the Boolean or logical equations defining the programming therein set forth in the manner previously described in copending application for patent, Serial No. 291,477, now U. S. Patent No. 2,733,430 issued January 31, 1956 for "Angular Quantizer" to the present inventor.

$$Sa=(+1).c1 \qquad \text{(Eq. 1)}$$
$$Za=a.p.c1 \qquad \text{(Eq. 2)}$$
$$Sp=p'.c1 \qquad \text{(Eq. 3)}$$
$$Zp=a'.p.c1 \qquad \text{(Eq. 4)}$$

Equation 1 is written by inspection from the previously described operation of converter 11. In the manner as also set forth in the above referred to application for patent, the gating networks capable of producing the programming of Table I may be mechanized from the equations and as such are illustrated in Fig. 1 as connected between the various signal conductors and flip-flop input terminals.

Figure 2:
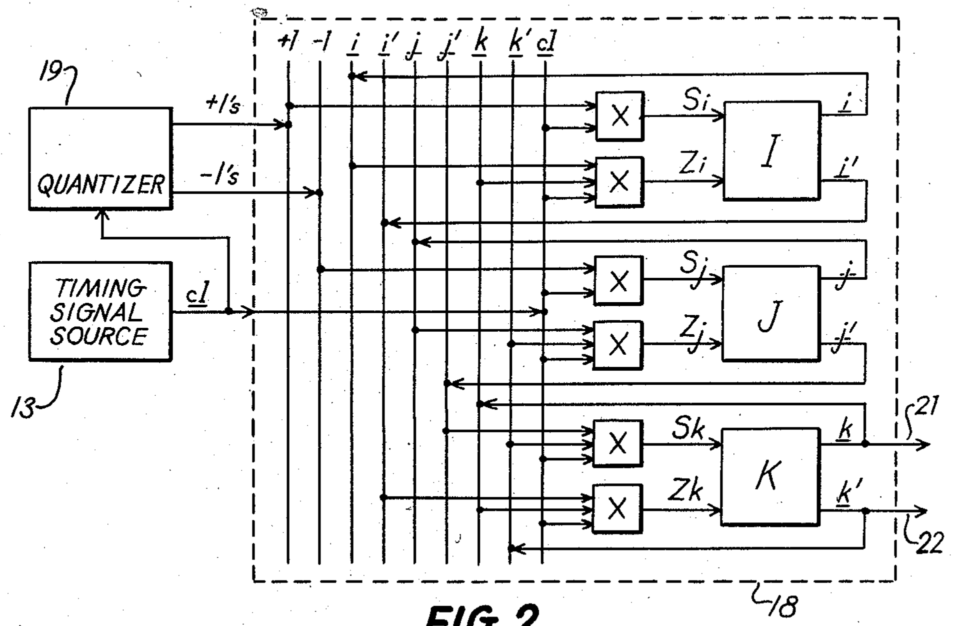
Fig. 2 is a block schematic circuit diagram of a double-valued di-function converter according to the present invention.

Referring now to Fig. 2, there is illustrated a double-valued di-function converter 18, according to the present invention, for converting +1 and −1 signals appearing on the pair of output terminals of a quantizer 19, which may be of the type described in U. S. Patent No. 2,733,430. Quantizer 19 receives input information from a rotating shaft, for example, rotatable in two directions and produces a high voltage level appearing for half a timing interval on its +1 signal terminal for each predetermined magnitude of rotation of the shaft in one direction, and a corresponding high voltage level appearing for a half a timing interval on its −1 signal terminal for the same magnitude of rotation in the opposite direction. The particular type of input information to quantizer 19 is immaterial other than to note that it should be capable of changing in two directions in order that such two directions may be represented by corresponding signals on the +1 and −1 output terminals thereof.

Timing signal source 13 again is illustrated and applies timing signal $c1$ to both converter 18 and quantizer 19 in order that the random output signals from quantizer 19 appear within predescribed timing limits.

There are three electronic switching circuits, such as flip-flops I, J and K, within converter 18, flip-flop K being the principal one and corresponding to flip-flop P of the converter of Fig. 1. Flip-flop K produces a pair of complementary output signals, $k$ and $k'$, appearing on the output conductors 21 and 22, respectively, of quantizer 18. In operation, flip-flops I and J are normally in one conduction state and flip-flop K, in response to the one conduction state, is normally triggered by the gating circuits connected to its input conductors into alternate conduction states at the beginning of successive timing intervals. Upon receipt of a +1 signal from quantizer 19, flip-flop I has its normal conduction state reversed and, in response to the reversed conduction state thereof, flip-flop K is not triggered into producing its next regularly occurring low voltage level to thereby produce in its output signal $k$, two successive +1 di-function values. Then, flip-flop I is automatically switched back to its normal conduction state and flip-flop K is again alternately switched between its two states, and the converter is again prepared for receipt of the next input signal from quantizer 19.

Upon receipt of a −1 signal from the quantizer, flip-flop J is switched from its normal conduction state, and in response thereto, flip-flop K is not triggered into producing its next normally regularly occurring high voltage level or +1 value with the result that two consecutive low voltage levels appear in signal $k$ on conductor 21. After this, flip-flop J is automatically triggered back to its normal conduction state, signal $k$ again varies between +1 and −1 values and converter 18 is again prepared for receipt of the next input signal from quantizer 19.

The manner for deriving the required gating circuitry for accomplishing the above stated results may be most readily understood by reference to the below included Programming Table II.

PROGRAMMING TABLE II

| Line | Input | | Contents | | | To generate | | |
|---|---|---|---|---|---|---|---|---|
| | +1 | −1 | $i$ | $j$ | $k$ | $i$ | $j$ | $k$ |
| 1 | ----- | ----- | −1 | −1 | −1 | ----- | ----- | +1 |
| 2 | ----- | ----- | −1 | −1 | +1 | ----- | ----- | −1 |
| 3 | 1 | ----- | −1 | −1 | X | +1 | ----- | ----- |
| 4 | ----- | ----- | +1 | −1 | −1 | ----- | ----- | +1 |
| 5 | ----- | ----- | +1 | −1 | +1 | −1 | ----- | ----- |
| 6 | ----- | 1 | −1 | −1 | X | ----- | +1 | ----- |
| 7 | ----- | ----- | −1 | +1 | +1 | ----- | ----- | −1 |
| 8 | ----- | ----- | −1 | +1 | −1 | ----- | −1 | ----- |
| Col | 1 | 2 | 3 | 4 | 5 | 6 | 7 | 8 |

Lines 1 and 2 indicate the normal triggering operations to be performed in the absence of +1 and −1 input signals. Here, as stated, flip-flop K is alternately triggered to produce alternate +1 and −1 values in signal $k$.

Lines 3 through 5 indicate the programming when, as on line 3, a +1 input signal is received, the X in column 5 for signal $k$ indicating that such may occur when $k$ equals −1 as on line 4, or +1 as on line 5. The programming indicated on lines 4 and 5 are similar to that described on lines 3 and 4 of Table I where here, on line 4, flip-flop I is initially switched so that $i$ equals +1 at the instant $k$ equals −1. This requires, as previously, a generation of the flip-flop "Contents" indicated on line 5 on which line is illustrated, by the absence of the next triggering of flip-flop K in column 8, the extra $k=+1$ value to be generated. As formerly, if flip-flop I is initially switched so that $i$ equals +1 when $k$ equals +1 as on line 5, only the "To Generate" columns thereof are observed with the line 4 program being omitted.

Lines 6 through 8 of Table II are analogous to lines 3 through 5 thereof except that here is found the programming caused by the receipt of a −1 signal from quantizer 19. The −1 signal indicated in column 2, line 6 generates a +1 value in signal $j$, the −1 signal occurring either when $k$ is equal to +1 or −1 as indicated by the X in column 5. Signal $j$ may initially take its resultant +1 value when $k$ equals +1 as on line 7 in which case the "Contents" columns of line 8 are generated at the beginning of the next timing interval or it may become initially equal to +1 when $k$ equals −1 as on line 8. In either event, the blank in line 8, column 8, indicates that the −1 value of signal $k$ in column 5 is not changed with the result that an extra −1 value thereby is generated to indicate the receipt of the −1 signal. As is also indicated in column 7, signal $j$ is set equal to its normal −1 value at the beginning of the next timing interval so that the converter may respond to the next received input +1 or −1 signal.

As was done formerly in connection with Table I, Boolean equation may be written corresponding to the programming defined in Table II, which equations, after appropriate reduction by logical tautologies, are as follows:

$$S_i=(+1)\cdot c1 \qquad \text{(Eq. 5)}$$
$$Z_i=i\cdot k\cdot c1 \qquad \text{(Eq. 6)}$$
$$S_j=(-1)\cdot c1 \qquad \text{(Eq. 7)}$$
$$Z_j=j\cdot k'\cdot c1 \qquad \text{(Eq. 8)}$$
$$S_k=j'\cdot k'\cdot c1 \qquad \text{(Eq. 9)}$$
$$Z_k=i'\cdot k\cdot c1 \qquad \text{(Eq. 10)}$$

Mechanization of Eq. 5 through 10 provides the gating circuitry illustrated in converter 18 of Fig. 2.

Figure 3:
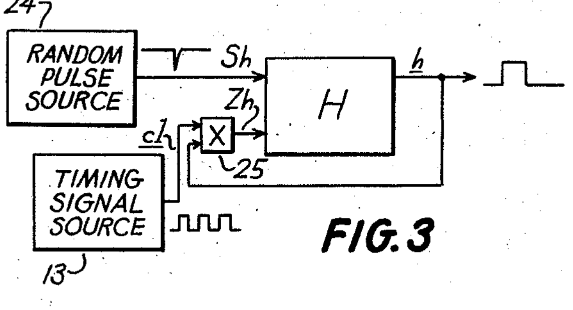
Fig. 3 is a block schematic circuit diagram of a device for changing random pulse information into a form suitable for the converters of Figs. 1 and 2.

In order that the converter of Figs. 1 and 2 may be used for converting random appearing pulses into equivalent di-function signals, there is illustrated in Fig. 3 a device for converting such pulses into signals suitable for operating the converters. A source 24 of random pulses is connected directly to the $S_h$ input conductor of an electronic switching device, such as flip-flop H, the signal $h$ output conductor thereof being connected to one input terminal of an "and" gating circuit 25. The other input terminal of circuit 25 receives timing signal $c1$ from timing signal source 13, with the output terminal of circuit 25 being connected to the $Z_h$ input conductor of flip-flop H.

In operation, with signal $h$ low, a pulse from source 24 triggers flip-flop H with signal $h$ switching to its high voltage level to thereby prepare gating circuit 25 for opening. The next appearing high voltage level in signal $c1$ acts through circuit 25 to trigger flip-flop H to its original conduction state with signal $h$ again being at its low voltage level.

The parameters of circuit 25 should be so adjusted as to have a relatively slow response time in order that if a random pulse should occur just before the ending of a timing interval, the ensuing high voltage level in signal $h$ will not be immediately effective through circuit 25 to switch signal $h$ back to its low voltage level. If this is done, then signal $h$ will remain at its high voltage level until the end of the next interval, and hence be effective to actuate the converter to which it is applied. The manner of delaying the response of circuit 25, assuming it to be a crystal diode gating circuit, is well known to those skilled in the art.

The device of Fig. 3 may be utilized with the converter of Fig. 1 and two of such devices may be utilized with the pair of input conductors of converter 18. With either, random appearing pulses may be readily converted into equivalent di-function output signals.

As will be apparent to those skilled in the art, the specific program relationships set forth in Programming Tables I and II are aribitrary in the sense that the flip-flop triggering operations defined on each line thereof could obviously be changed while yet retaining the desired converter input-output signal relationships. Each set of these possible programming relationships would yield a different set of Boolean equations corresponding thereto, each set of equations when mechanized, forming circuitry capable of producing the identical herein set forth results.

As will be also appreciated by those skilled in the art, each of the Equations 1 through 10 may be modified in form by the use of logical tautologies in accordance with Boolean algebra rules without changing the essential operation of the converters although resulting in different gating networks therein.

I claim:

1. A device for converting random appearing signals into a di-function signal train, said device comprising: means for producing a normally zero-valued di-function signal train including alternate first and second signals representing first and second numbers, respectively, during consecutive timing intervals; and means for producing one of said first and second signals for two consecutive timing intervals to change the di-function value of the normally zero-valued signal upon each appearance of an input signal.

2. A device for converting random appearing signals into a di-function signal, said device comprising: means for producing alternate high and low voltage levels, each of said voltage levels normally appearing for a timing interval; and means responsive to each appearance of an input signal for causing the first-named means to produce one of said voltage levels for two consecutive timing intervals.

3. A device for converting random appearing signals into a di-function signal comprising alternate high and low voltage levels, each of said voltage levels appearing for an integral number of timing intervals, said device comprising: actuable means responsive to first and second input signals for producing high and low output voltage levels, respectively; normally operable means for applying alternate first and second input signals at the end of consecutive timing intervals to said actuable means; and means responsive to each appearance of an input signal for rendering said normally operable means inoperative for one timing interval to apply one of the first or second input signals to said actuable means.

4. A device for converting random appearing signals into di-function signal form, said device comprising: electronic switching means having first and second input terminals and responsive to signals applied to said first and second terminals for producing first and second output voltage levels, respectively; normally operable means for consecutively applying signals alternately to said first and second terminals; and means responsive to each appearance of an input signal for rendering said normally operable means inoperative to apply the next consecutive signal to said first input terminal.

5. A device for converting random appearing first and second signals into a di-function signal train, said device comprising: means for producing a normally zero-valued di-function signal train including alternate positive and negative signals during a time period; and means for increasing the number of positive and negative signals during the said period by one to modify the zero value of said di-function signal train positively and negatively on appearance of each the first and second input signal, respectively during said period.

6. A device for converting random appearing first and second input signals into di-function signal form, said device comprising: normally operable means for producing an output signal representing alternate +1 and −1 instantaneous di-function values during a time period; and means for rendering said normally operable means temporarily inoperative to produce in said output signal the next regularly occurring −1 or +1 value in response to each appearance of a first or second input signal, respectively during said time period said means including apparatus for again rendering said normally operable means operative for the production in said output signal of the next +1 or 1 value normally succeeding said before-named next regularly occurring +1 or −1 value respectively, whereby production of only a single +1 or −1 value is prevented in response to each appearance of a first or second input signal respectively.

7. A device for converting random signals appearing on first and second conductors into a di-function signal, said di-function signal comprising alternate high and low voltage levels, each of said levels appearing for an integral number of timing intervals, said device comprising: actuable means having first and second input terminals and responsive signals applied to said first and second input terminals for producing an output signal representing 1st and 2nd instantaneous di-function values, respectively; normally operable means for applying signals alternately to said first and second input terminals at the end of consecutive timing intervals; and means responsive to the appearance of a random signal on either said first or second conductor for rendering said normally operable means inoperative to apply the next regular signal to said first or second input terminal, respectively.

8. A device for converting random appearing signals into an equivalent di-function signal, said device comprising: electronic switching means normally in a first conduction state; means responsive to each random appearing signal for triggering said electronic switching means into a second conduction state; means for producing an output signal representing alternate 1st and 2nd instantaneous di-function values, said means being responsive to the second conduction state of said switching means for producing an extra 1st di-function value in said output signal; and means responsive to the simultaneous appearance of the second conduction state of said switching means and the extra 1st di-function value in said output signal for switching said switching means into its first conduction state.

9. A device for converting random appearing signals into an equivalent di-function signal, said di-function signal comprising alternate high and low voltage levels, each of said voltage levels appearing for an integral number of timing intervals, said device comprising: selectively actuable means having first and second input conductors and responsive to signals applied to said first and second conductors for producing high and low output voltage levels, respectively; normally operable means for alternately applying signals to said first and second input conductors at the end of consecutive timing intervals; electronic switching means normally in a first conduction state; means responsive to each random appearing signal for triggering said switching means into a second conduction state; means responsive to the second conduction state of said switching means for rendering said normally operable means inoperative for applying the next consecutive signal to the second input conductor of said selectively actuable means; and means responsive to the action of the last-named means for triggering said switching means into its first conduction state.

10. A device for converting random signals appearing on first and second conductors into a di-function signal, said device comprising: first and second electronic switching means, each of said means being normally in a first conduction state; means responsive to each random appearing pulse on the first or second conductors for triggering said first or second switching means, respectively, into a second conduction state; means for producing an output signal representing consecutive alternate first and second instantaneous di-function values, said means being responsive to the second conduction states of said first or second switching means for producing two consecutive first or second di-function values, respectively in said output signal; and means responsive to the simultaneous appearance of the second conduction state of said first or second switching means and the extra first or second di-function values, respectively, in said output signal for switching said first or said second switching means, respectively, into its first conduction state.

11. A device for converting random signals appearing on first and second conductors into a di-function signal, said di-function signal having alternate high and low voltage levels, each of said voltage levels appearing for an integral number of timing intervals, said device comprising: selectively actuable means having first and second input conductors and responsive to signals applied to said first and second conductors for producing high and low output voltage levels, respectively; normally operable means for alternately applying signals to said first and second input conductors at the end of consecutive timing intervals; first and second electronic switching means normally in a first conduction state; means responsive to each random appearing pulse on the first or second conductors for triggering said first or second switching means, respectively, into a second conduction state; means responsive to the second conduction state of either said first or said second switching means for rendering said normally operable means inoperative for applying the next regularly occurring signal to either the second or the first input conductor, respectively, of said selectively actuable means; and means responsive to the second conduction state of said first or second switching means for applying a signal to said first input conductor of said first or second switching means, respectively, simultaneously when the last-named means renders said normally operable means inoperative.

12. A device for converting random appearing +1 signals into a corresponding di-function signal, each of said +1 signals comprising a high voltage level appearing for at least half a timing interval measured by an adjacent low and high voltage level of a timing signal $c1$, said device comprising: a principal flip-flop P having $S_p$ and $Z_p$ input terminals and producing complementary output signals $p$ and $p'$, said flip-flop P being responsive to signals applied to said $S_p$ and $Z_p$ input terminals for producing high and low, and low and high voltage levels in said output signals $p$ and $p'$, respectively; a flip-flop A having $S_a$ and $Z_a$ input terminals and producing complementary output signals $a$ and $a'$, said flip-flop A being responsive to signals applied to said $S_a$ and $Z_a$ input terminals for producing high and low, and low and high voltage levels in said output signals $a$ and $a'$, respectively; first means responsive to each simultaneous appearance of a high voltage level in signal $c1$ and the +1 signal for applying a signal to said $S_a$ input conductor; second means responsive to each simultaneous appearance of a high voltage level in signals $a$, $p$ and $c1$ for applying a signal to said $Z_a$ input conductor; third means responsive to each simultaneous appearance of a high voltage level in signals $p'$ and $c1$ for applying a signal to said $S_p$ input conductor; and fourth means responsive to each simultaneous appearance of a high voltage level in signals $a'$, $p$ and $c1$ for applying a signal to said $Z_p$ input conductor whereby signal $p$ comprises the output di-function signal of the device.

13. A device for converting random appearing +1 signals into a corresponding di-function signal, each of said +1 signals comprising a high voltage level appearing for at least half a timing interval measured by an adjacent low and high voltage level of a timing signal $c1$, said device comprising: a principal flip-flop P having $S_p$ and $Z_p$ input terminals and producing complementary output signals $p$ and $p'$, said flip-flop P being responsive to signals applied to said $S_p$ and $Z_p$ input terminals for producing high and low, and low and high voltage levels in said output signals $p$ and $p'$, respectively; a flip-flop A having $S_a$ and $Z_a$ input terminals and producing complementary output signals $a$ and $a'$, said flip-flop A being responsive to signals applied to said $S_a$ and $Z_a$ input terminals for producing high and low and low and high voltage levels in said output signals $a$ and $a'$, respectively; a first gating circuit comprising the mechanization of a function of the Boolean equation $p' \cdot c1$ for applying signals to said $S_p$ input conductors upon electrical satisfaction of its corresponding equation; a second gating circuit comprising the mechanization of a function of the Boolean equation $a' \cdot p \cdot c1$ for applying signals to said $Z_p$ input conductors upon electrical satisfaction of its corresponding equation; a third gating circuit comprising the mechanization of a function of the Boolean equation $+1 \cdot c1$ for applying signals to said $S_a$ input conductor upon electrical satisfaction of its corresponding equation; and a fourth gating circuit comprising the mechanization of a function of the Boolean equation $a \cdot p \cdot c1$ for applying signals to said $Z_a$ input conductor upon electrical satisfaction of its corresponding equation whereby signal $p$ comprises the output di-function signal of the device.

14. A device for converting random appearing +1 signals on a first input conductor and random appearing −1 signals on a second conductor into a corresponding di-function signal, each of said +1 and −1 signals comprising a high voltage level appearing for substantially half a timing interval as measured by an adjacent low and high voltage level of a timing signal $c1$, said device comprising: a principal flip-flop K having $S_k$ and $Z_k$ input terminals and producing complementary output signals $k$ and $k'$, said flip-flop K being responsive to signals applied to said $S_k$ and $Z_k$ input terminals for producing high and low, and low and high voltage levels in said output signals $k$ and $k'$, respectively; a flip-flop I having $S_i$ and $Z_i$ input terminals and producing complementary output signals $i$ and $i'$, said flip-flop I being responsive to signals applied to said $S_i$ and $Z_i$ input terminals for producing high and low, and low and high voltage levels in said output signals $i$ and $i'$, respectively; a flip-flop J having $S_j$ and $Z_j$ input terminals and producing complementary output signals $j$ and $j'$, said flip-flop J being responsive to signals applied to said $S_j$ and $Z_j$ input terminals for producing high and low, and low and high voltage levels in said output signals $j$ and $j'$, respectively; first means responsive to each simultaneous appearance of a high voltage level in signal $c1$ and the $+1$ signal for applying a signal to said $S_i$ input conductor; second means responsive to each simultaneous appearance of a high voltage level in signals $i$, $k$ and $c1$ for applying a signal to said $Z_i$ input conductor; third means responsive to each simultaneous appearance of a high voltage level in signal $c1$ and the $-1$ signal for applying a signal to said $S_j$ input conductor; fourth means responsive to each simultaneous appearance of a high voltage level in signals $j$, $k'$ and $c1$ for applying a signal to said $Z_j$ input conductor; fifth means responsive to each simultaneous appearance of a high voltage level in signals $j'$, $k'$ and $c1$ for applying a signal to said $S_k$ input conductor; and sixth means responsive to each simultaneous appearance of a high voltage level in signals $i'$, $k'$ and $c1$ for applying a signal to said $S_k$ input conductor whereby signal $k$ comprises the di-function signal of the device.

15. A device for converting random appearing $+1$ signals on a first input conductor and random appearing $-1$ signals on a second conductor into a corresponding di-function signal, each of said $+1$ and $-1$ signals comprising a high voltage level appearing for substantially half a timing interval as measured by an adjacent low and high voltage level of a timing signal $c1$, said device comprising: a principal flip-flop K having $S_k$ and $Z_k$ input terminals and producing complementary output signals $k$ and $k'$, said flip-flop K being responsive to signals applied to said $S_k$ and $Z_k$ input terminals for producing high and low, and low and high voltage levels in said output signals $k$ and $k'$, respectively; a principal flip-flop I having $S_i$ and $Z_i$ input terminals and producing complementary output signals $i$ and $i'$, said flip-flop I being responsive to signals applied to said $S_i$ and $Z_i$ input terminals for producing high and low, and low and high voltage levels in said output signals $i$ and $i'$, respectively; a principal flip-flop J having $S_j$ and $Z_j$ input terminals and producing complementary output signals $j$ and $j'$, said flip-flop J being responsive to signals applied to said $S_j$ and $Z_j$ input terminals for producing high and low, and low and high voltage levels in said output signals $j$ and $j'$, respectively; a first gating circuit comprising the mechanization of a function of the Boolean equation $+1 \cdot c1$ for applying signals to said $S_i$ input conductor upon electrical satisfaction of its corresponding equation; a second gating circuit comprising the mechanization of a function of the Boolean equation $i \cdot k \cdot c1$ for applying signals to said $Z_i$ input conductor upon electrical satisfaction of its corresponding equation; a third gating circuit comprising the mechanization of a function of the Boolean equation $-1 \cdot c1$ for applying signals to said $S_j$ input conductor upon electrical satisfaction of its corresponding equation; a fourth gating circuit comprising the mechanization of a function of the Boolean equation $j \cdot k' \cdot c1$ for applying signals to said $Z_i$ input conductor upon electrical satisfaction of its corresponding equation; a fifth gating circuit comprising the mechanization of a function of the Boolean equation $j' \cdot k' \cdot c1$ for applying signals to said $S_k$ input conductor upon electrical satisfaction of its corresponding equation; and a sixth gating circuit comprising the mechanization of a function of the Boolean equation $i' \cdot k \cdot c1$ for applying signals to said $Z_k$ input conductor upon electrical satisfaction of its corresponding equation, whereby signal $k$ comprises the di-function output signal of the device.

16. A device for converting random appearing input signals into a train of sequentially appearing bivalued output signals said device comprising: means for normally producing alternately appearing 1st and 2nd output signals representing $+1$ and $-1$, respectively, during consecutive timing intervals and means responsive to each appearance of an input signal for causing said first named means to produce identical output signals during two consecutive intervals.

References Cited in the file of this patent

UNITED STATES PATENTS

| | | |
|---|---|---|
| 2,053,749 | Steeneck | Sept. 8, 1936 |
| 2,209,883 | Gohorel | July 30, 1940 |
| 2,364,771 | Bascom et al. | Dec. 12, 1944 |
| 2,604,527 | Buehler | July 22, 1952 |
| 2,609,143 | Stibitz | Sept. 2, 1952 |
| 2,685,082 | Beman et al. | July 27, 1954 |

UNITED STATES PATENT OFFICE

Certificate of Correction

Patent No. 2,850,726

September 2, 1958

Floyd G. Steele

It is hereby certified that error appears in the printed specification of the above numbered patent requiring correction and that the said Letters Patent should read as corrected below.

Column 1, line 33, for "value" read —valued—; column 2, line 68, strike out "each of"; line 69, for "applications" read —application—; column 3, line 2, for "provide" read —provides—; column 4, line 6, for "applications" read —application—; column 8, line 22, after "each" strike out "the"; line 36, for "1 value" read — −1 value—; line 47, after "responsive" insert —to—; column 11, line 15, for "$j'$" read —$i'$—; line 16, for "$k'$" read —$k$—; same line 16, for "$S_k$" read —$Z_k$—; column 12, line 32, after "consecutive" insert —timing—.

Signed and sealed this 16th day of December 1958.

[SEAL]

Attest:

KARL H. AXLINE,
*Attesting Officer.*

ROBERT C. WATSON,
*Commissioner of Patents.*